(12) United States Patent
Kohl

(10) Patent No.: US 11,745,980 B2
(45) Date of Patent: Sep. 5, 2023

(54) VERTICAL TRANSPORTATION LIKE ELEVATOR, ESCALATOR, DUMBWAITER AND LIFT SYSTEMS MONITORING, MAINTENANCE, REPAIR, INSPECTION, TESTING AND MODERNIZATION SYSTEM AND METHOD

(71) Applicant: Laurie Kohl, Chicago, IL (US)

(72) Inventor: Laurie Kohl, Chicago, IL (US)

(73) Assignee: JAKA LLC, Tarpon Springs, FL (US)

( * ) Notice: Subject to any disclaimer, the term of this patent is extended or adjusted under 35 U.S.C. 154(b) by 1293 days.

(21) Appl. No.: 16/229,302

(22) Filed: Dec. 21, 2018

(65) Prior Publication Data

US 2019/0193991 A1  Jun. 27, 2019

Related U.S. Application Data

(60) Provisional application No. 62/609,399, filed on Dec. 22, 2017.

(51) Int. Cl.
| | |
|---|---|
| B66B 1/34 | (2006.01) |
| B66B 5/00 | (2006.01) |
| B66B 25/00 | (2006.01) |
| G06Q 10/20 | (2023.01) |
| H04L 51/42 | (2022.01) |

(52) U.S. Cl.
CPC .......... *B66B 5/0025* (2013.01); *B66B 5/0031* (2013.01); *B66B 25/006* (2013.01); *G06Q 10/20* (2013.01); *H04L 51/42* (2022.05)

(58) Field of Classification Search
CPC ... B66B 1/3461; B66B 5/0025; B66B 5/0037; B66B 3/002; B66B 5/0031; G06Q 10/20
USPC .......................................................... 187/393
See application file for complete search history.

(56) References Cited

U.S. PATENT DOCUMENTS

| | | | |
|---|---|---|---|
| 2013/0015022 A1* | 1/2013 | Sonnenmoser | B66B 7/064 187/394 |
| 2015/0142339 A1* | 5/2015 | Liu | B66B 5/0037 702/35 |
| 2017/0011318 A1* | 1/2017 | Vigano | G06N 20/00 |
| 2018/0186599 A1* | 7/2018 | Shaw | B66B 5/0025 |
| 2019/0185292 A1* | 6/2019 | Yang | B66B 5/0025 |
| 2021/0371248 A1* | 12/2021 | Schmidt | B66B 25/006 |
| 2021/0403277 A1* | 12/2021 | Flores | B66B 5/0018 |
| 2022/0177266 A1* | 6/2022 | Daniels | B66B 3/002 |

\* cited by examiner

*Primary Examiner* — Long T Tran
*Assistant Examiner* — James J Kim
(74) *Attorney, Agent, or Firm* — Justin Lampel

(57) ABSTRACT

An vertical transportation elevator, escalator, dumbwaiter and lift systems monitoring, maintenance, repair, inspection, testing and modernization system and method is provided. The system and method may provide real-time information to a technician, buildings, property managers, facility managers, owners of building, building engineers, regarding the current state of the equipment, status of inspections, status of testing, repairs, modernization history of maintenance real time maintenance performed on equipment and characteristics of the equipment, and future requirements of the elevator.

10 Claims, 5 Drawing Sheets

VERTICAL TRANSPORTATION LIKE ELEVATOR, ESCALATOR, DUMBWAITER AND LIFT SYSTEMS MONITORING, MAINTENANCE, REPAIR, INSPECTION, TESTING AND MODERNIZATION SYSTEM AND METHOD

CROSS-REFERENCE TO RELATED APPLICATIONS

The following application is based on and claims the priority benefit of U.S. provisional application Ser. No. 62/609,399 filed Dec. 22, 2017 currently co-pending; the entire contents of which are incorporated by reference.

BACKGROUND OF THE INVENTION

An vertical transportation elevator, escalator, dumbwaiter and lift systems monitoring, maintenance, repair, inspection, testing and modernization system and method is provided. Although the present application may simply refer to "elevators" at times, the present system and method allows building owners to monitor, record and protect all vertical transportation including elevator, escalator, dumbwaiter, and lift maintenance records, modernization, testing, inspection like all vertical transportation safety code requirements and changes associated with the same. The system and method are suitable for all building mechanical equipment, devices and utilities that are required by industry best practices and/or code requirements. The system and method allow for an administrator to create/edit/view and delete users, buildings, property managers, facility managers, owners of building, building engineers, contractors, elevators, elevator tasks, service level agreements, all contractual terms, characteristics of elevators and it's systems (running, temperature, heat, etc), inspection status, testing status, modernization process and equipment details within the created system. Various "roles" will allow different people in different capacities to access and/or edit specific parts of the system. The system and method may provide real-time information to a technician, buildings, property managers, facility managers, owners of building, building engineers, anyone using the system regarding the current state of the equipment, status of inspections, status of testing, repairs, modernization, history of maintenance, real time maintenance performed on equipment and characteristics of the equipment, and future requirements of the elevator.

Attempts have been made to provide safety inspection and maintenance systems for buildings. For example, U.S. Pat. No. 7,606,919 to Labedz discloses a system for managing operational facilities that is of the type which utilizes predefined events to carry out managing operations for the facilities. The system includes one or more servers adapted to receive events from a client and forward the events to a clearinghouse via a communication link. The system further includes one or more clients, each of which has a unique login identity, adapted to selectively send events to the server via the communication link. Also included is a clearinghouse connected to each of the server and each of the client via the communication link for selectively storing data from each server and each client in a database, and being adapted to selectively authorize predetermined events by each client according to the login identity of each such client, to selectively schedule predetermined events in response to data stored in the database and to monitor the status of all events stored in the database.

Further, U.S. Pat. No. 4,568,909 to Whynacht discloses a plurality of operating systems in buildings organized in geographical groups, each group having a local service office, are monitored at both the local offices and a central office for the presence of various combinations of performance criteria defining alarm conditions.

However, these patents fail to describe an efficient and easy to use elevator, escalator, dumbwaiter and lift systems monitoring, maintenance, repair, inspection, code, testing and modernization system and method. A need, therefore, exists for an improved elevator, escalator, dumbwaiter and lift monitoring, inspection, testing, modernization and servicing system and method to ensure the maintenance service technician completes the work needed for the equipment by using the system which has a dual login and can only be accessed when onsite with the initial building or user with higher user authentication rights logging in prior to the service provider or the technician. The initial log in can be logged in can last until the password is changed.

SUMMARY OF THE INVENTION

An elevator, escalator, dumbwaiter and lift systems monitoring, maintenance, repair, inspection, testing and modernization system and method is provided. Although the present application may simply refer to "elevators" at times, the present system and method allows building owners to monitor, record and protect all vertical transportation. elevator, escalator, dumbwaiter, and lift maintenance records, safety code requirements and charges associated with the same. The system and method are suitable for building equipment, devices and utilities that are required by industry best practices and/or code requirements. The system and method allow for an administrator to create/edit/view and delete users, buildings, property managers, facility managers, owners of building, building engineers, contractors, elevators, elevator tasks, service level agreements, testing inspections dates, all contractual terms, characteristics of elevators and it's systems (running, temperature, heat, etc), inspection status, testing status, modernization process and equipment details within the system. Various "roles" will allow different people in different capacities with different user rights to access and/or edit specific parts of the system. The system and method may provide real-time information to a technician, buildings, property managers, facility managers, owners of building, building engineers, regarding the current state of the equipment, status of inspections, status of testing, repairs, modernization, history of maintenance and characteristics of the equipment, and future requirements of the elevator, escalator, dumbwaiter or lift.

An advantage of the present elevator, escalator, dumbwaiter and lift systems monitoring, maintenance, repair, inspection, testing and modernization system and method is that the present system and method allows for a building owner, property manager, facility manager, building engineers, to easily track and monitor elevator maintenance records and service received on the equipment, inspections required by the authority having jurisdiction, testing required per code, modernization of elevators, numerous attributes of the equipment like temperature, heat, vibration, etc, safety code requirements and charges associated with the same in real time.

And another advantage of the present elevator, escalator, dumbwaiter and lift systems monitoring, maintenance, repair, inspection, testing and modernization system and method is that the present system and method may provide real-time information to a technician building, property managers, facility managers, owners of building, building engineers, regarding the current state of the equipment, status of inspections, status of testing, repairs, modernization status, history of maintenance and characteristics of the equipment, and future requirements of the elevator, escalator, dumbwaiter or lift.

Yet another advantage of the present elevator, escalator, dumbwaiter and lift systems monitoring, maintenance, repair, inspection, testing and modernization system and method instantly provides the potential options for servicing the elevator to a repair person/technician while onsite and provide information on all past service the elevators received.

Still advantage of the present elevator, escalator, dumbwaiter and lift systems monitoring, maintenance, repair, inspection, testing and modernization system and method is that the present system and method complies with current and past ASME A17.1 and other local, state and federal codes related to elevators, escalators, lifts maintenance control programs based on the code the authority having jurisdiction is under in the location of the building.

Yet another advantage of the present elevator, escalator, dumbwaiter and lift systems monitoring, maintenance, repair, inspection, testing and modernization system and method allows building owners and property managers with limited resources to hold their elevator service provider accountable for the services that they are contractually obligated to perform by comparing the contract and services in real time.

Another advantage of the present elevator, escalator, dumbwaiter and lift systems monitoring, maintenance, repair, inspection, testing and modernization system and method is that the present system and method eliminates unnecessary repairs or premature modernization.

Another advantage of the present elevator, escalator, dumbwaiter and lift systems monitoring, maintenance, repair, inspection, testing and modernization system and method is that the present system and method may inform the building, property managers, facility managers, owners of building, building engineers when current inspections are due or coming due so that they may confirm that they are code compliant. The system and method may inform the owners of the status of any inspection, any violations, and any cure period for any of the violation(s). Further, the system and method may inform the owner if a technician was on site to fix the item(s), the time needed for entire inspection process until they pass inspection and a certification of inspection has been issued and paid.

Another advantage of the present elevator, escalator, dumbwaiter and lift systems monitoring, maintenance, repair, inspection, testing and modernization system and method is that the present system and method may inform the building, property managers, facility managers, owners of building, building engineers when the required authority having jurisdiction testing is coming due so they can pass inspection, have safe equipment an follow the code requirements.

And another advantage of the present elevator, escalator, dumbwaiter and lift systems monitoring, maintenance, repair, inspection, testing and modernization system and method is that the present system and method allows building owners and property managers to avoid unnecessary callbacks and callback charges as well as traveling costs, invoice padding, obsolesces and other potential code violations.

Still another advantage of the present elevator, escalator, dumbwaiter and lift systems monitoring, maintenance, repair, inspection, testing and modernization system and method is that the present system and method which reduces or eliminates people being trapped in an elevator or entrapment issues.

Another advantage of the present elevator, escalator, dumbwaiter and lift systems monitoring, maintenance, repair, inspection, testing and modernization system and method is it requires the service provider to be onsite to complete all work through the dual login system. The service provider or technician cannot access the system to report what equipment work he is doing onsite unless he is onsite.

Another advantage of the present elevator, escalator, dumbwaiter and lift systems monitoring, maintenance, repair, inspection, testing and modernization system and method the present system and method may inform the building owner, property managers, facility managers, owners of building, building engineers data like temperature, heat, vibration to do some proactive maintenance of the equipment.

Another advantage of the present elevator, escalator, dumbwaiter and lift systems monitoring, maintenance, repair, inspection, testing and modernization system and method is that the present system and method may inform the building owner, property managers, facility managers, owners of building, building engineers is that it informs local, state and federal code requirements to remain in compliance for safety of people riding elevators, safety of the building.

For a more complete understanding of the above listed features and advantages of the present elevator, escalator, dumbwaiter and lift systems monitoring, maintenance, repair, inspection, testing and modernization system and method reference should be made to the detailed description and the detailed drawings. Further, additional features and advantages of the invention are described in, and will be apparent from, the detailed description of the preferred embodiments.

Informs and gives building a comprehensive overview of all

DETAILED DESCRIPTION OF THE PREFERRED EMBODIMENTS

Figure 1:
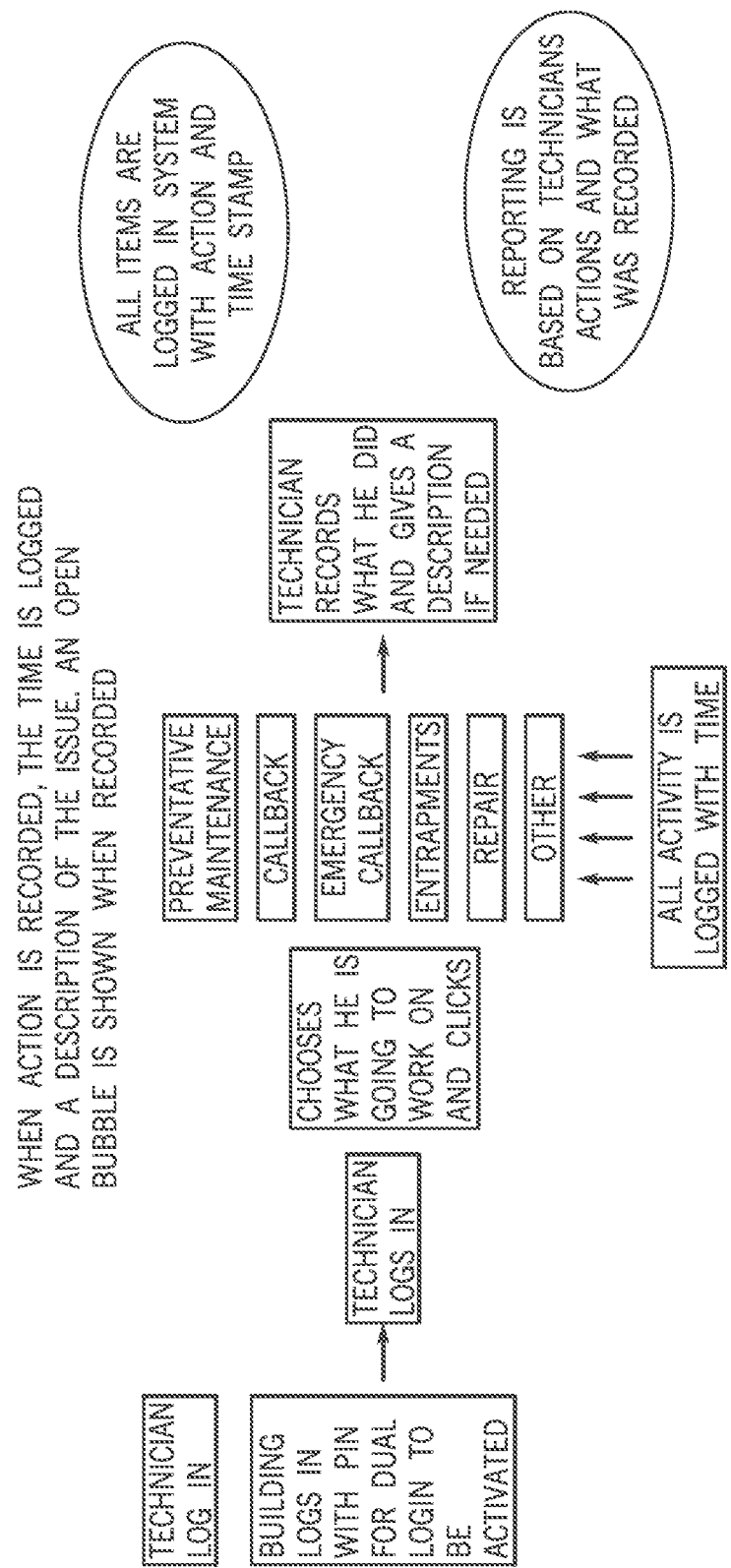
FIG. 1 illustrates a flow chart in one embodiment of the system.
Figure 2:
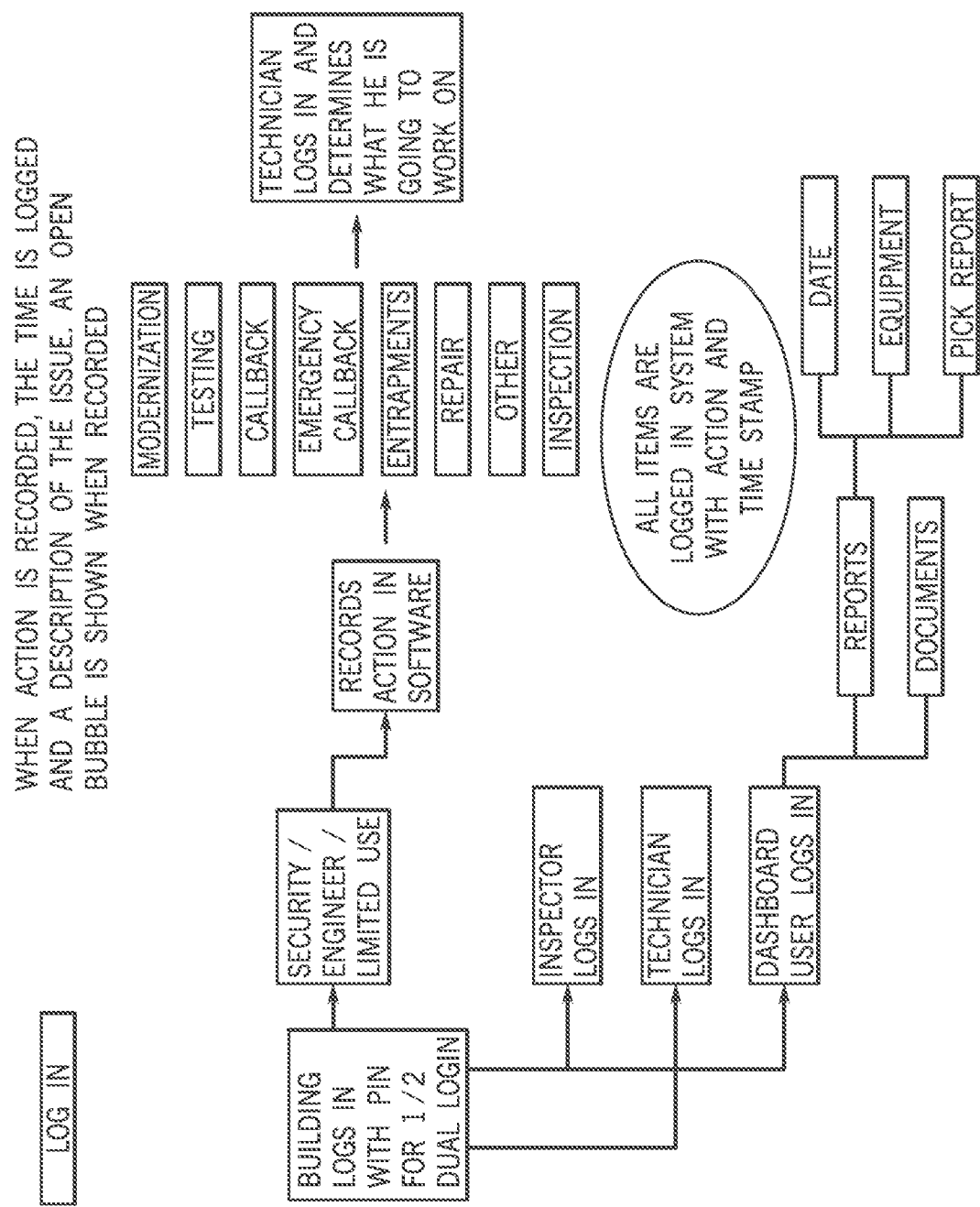
FIG. 2 illustrates a flow chart in one embodiment of the system.
Figure 3:
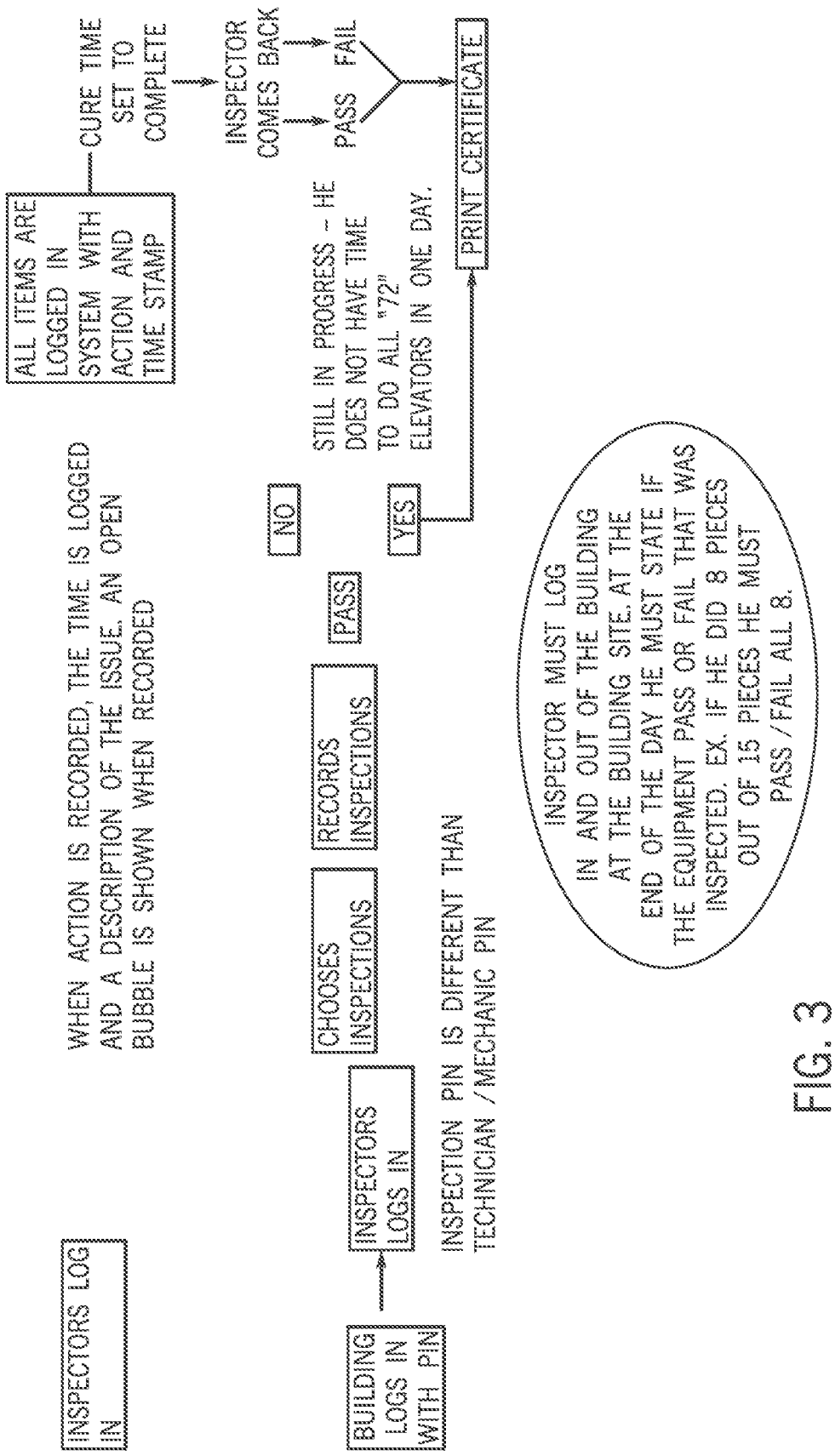
FIG. 3 illustrates a flow chart in one embodiment of the system.
Figure 4:
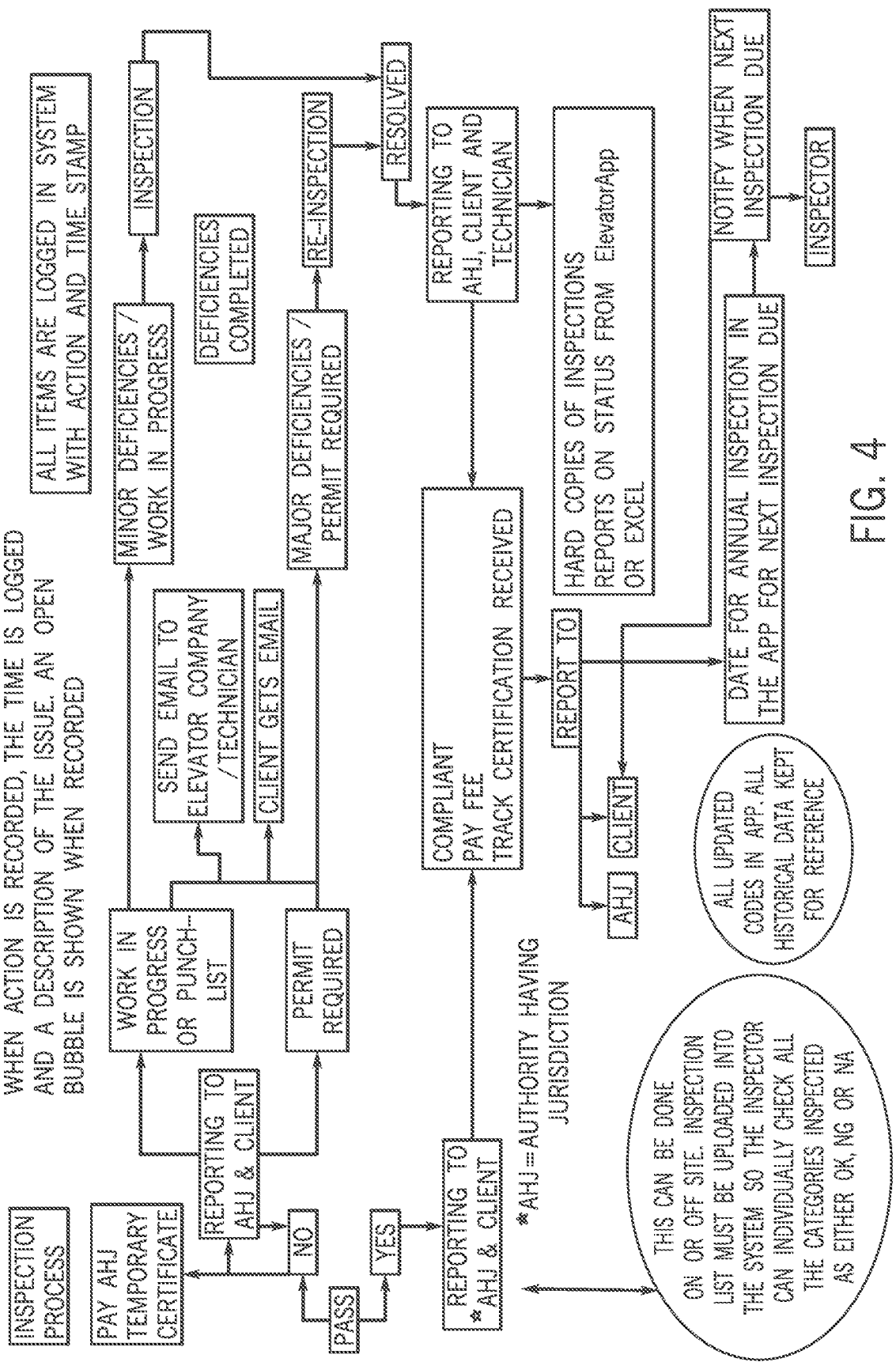
FIG. 4 illustrates a flow chart in one embodiment of the system.
Figure 5:
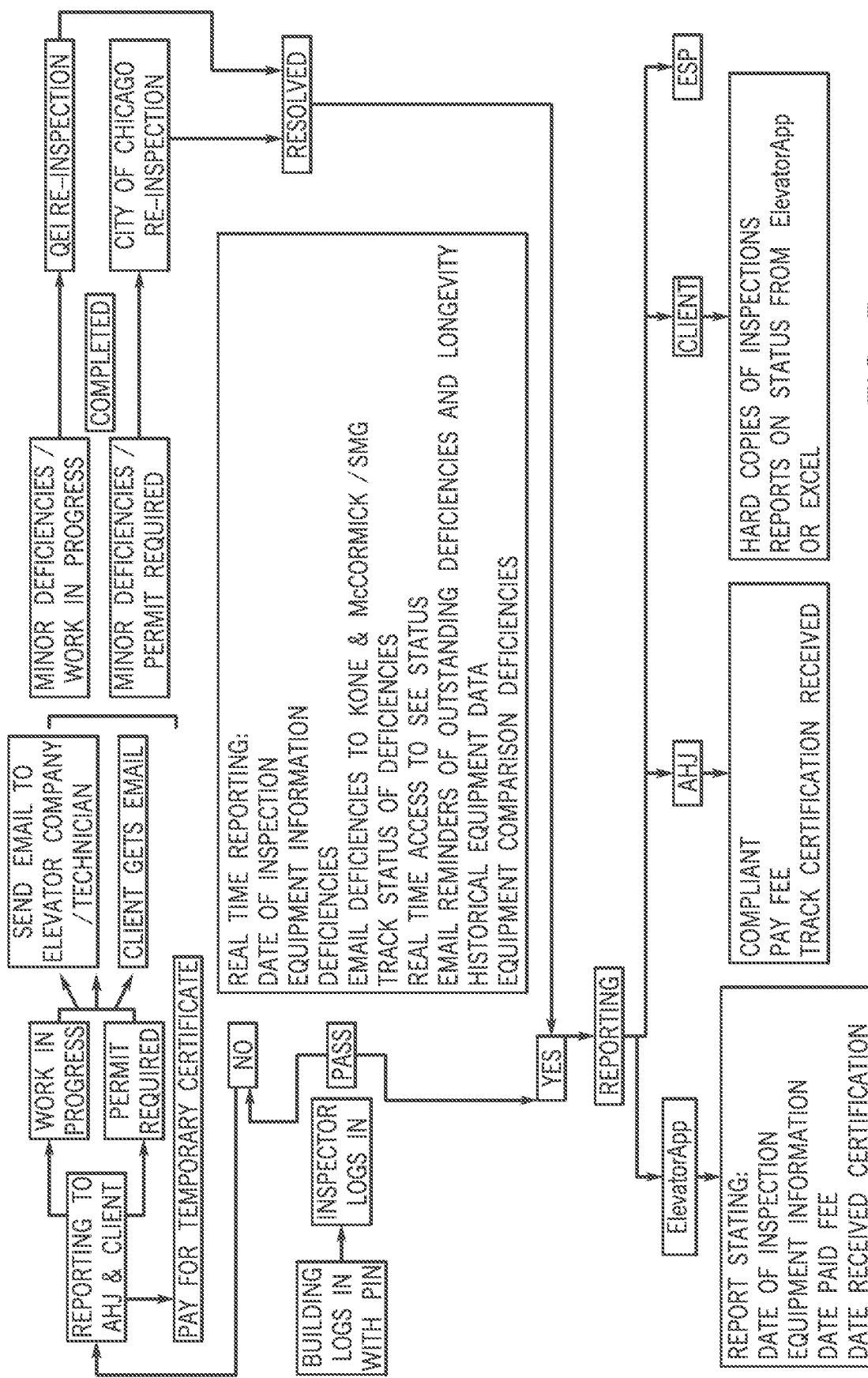
FIG. 5 illustrates a flow chart in one embodiment of the system.

An elevator, escalator, dumbwaiter and lift systems monitoring, maintenance, repair, inspection, testing and modernization system and method is provided. Although the present application may simply refer to "elevators" at times, the present system and method allows building owners to monitor, record and protect all vertical transportation devices like elevator, escalator, dumbwaiter, and lift maintenance records, safety code requirements and charges associated with the same. The system and method are suitable for building equipment, devices and utilities that are required by industry best practices and/or code requirements. The system and method allow for an administrator to create/edit/view and delete users, buildings, property managers, facility managers, owners of building, building engineers, contractors, elevators, elevator tasks, service level agreements, all contractual terms, characteristics of elevators and it's systems (running, temperature, heat, etc), inspection status, testing status, modernization process and equipment details within the created system. Various "roles" will allow different people in different capacities to access and/or edit specific parts of the system. The system and method may provide real-time information to a technician, buildings, property managers, facility managers, owners of building, building engineers, regarding the current state of the equipment, status of inspections status of testing, repairs, modernization history of maintenance and characteristics of the equipment, and future requirements of the elevator, escalator, dumbwaiter or lift.

Definitions

Preventative Maintenance. This is the tasking that is required by code on the elevators. The technician may be required to do a specific task per the contract and the code requirements. The technician may be required to perform the task(s) on a monthly, quarterly, yearly basis depending on the contract (this may be on a daily or weekly basis depending on the contract). The technician may input the work he/she performed after the work is a completed; however, the technician may be required to log in when the technician first arrives on site. When completed, the technician checks the required the task completed code task, contact ask or industry best practice task assigned to the equipment, or from a list of task entered for the location, add a task as necessary the technician has worked on.

Entrapment. Entrapment occurs when a person becomes trapped in an elevator. A signal in the system may automatically inform the building (building refers to property managers, facility managers, owners of building, building engineers, security person and/or someone of authority for the building) that someone is trapped, the elevator has stopped, a phone call was triggered from the emergency phone or the building recorded the entrapment in the system. The building may then call the elevator service provider and/or technician to get the person out and in some cases the fire department. This process is all recorded to meet the service level agreement of the contract and/or industry best practices. The technician must show up within an allotted time and the present system may either manually or automatically track and record the time the technician is onsite. A bubble (or "pop-up" or indicator on the building's computer screen, tablet, smartphone or electronic device) will show up once the technician is in the building. When the technician arrives on site a bubble or indicator may also pop up on the onsite computer, tablet or smartphone so that the technician knows which elevator he is work on. Since this is an emergency event the technician may just go solve the problem and record his actions once the entrapment has been resolved. Either way the system tracks, time called, time it took the technician to arrive on site, time it took to resolve the entrapment and the results of the entrapment. The system has the service level agreements from the contract in the system so it will inform the building if the technician met the service level agreement for response time on site and it will also track the number of entrapments to track if the elevator service provider is within contract service level agreements or industry best practices.

Callback. This is when there is a problem which is noticed by someone in the building either a tenant, basically anyone who has utilizes the elevators and reported to the building for the elevator service provider to send out a technician. This can also be noted automatically by the sensors around the system that have an anomaly from the parameters set in the system that will trigger a notification of the callback. This is all recorded to meet the service level agreements of the contract. The technician must show up within an allotted time and this is all tracked for reporting. A bubble or indicator may show up since it was recorded by the building in the system when the callback was noticed. The technician arrives on site and knows what to do or troubleshoot the callback on which elevator because the notification in the "bubble" or indicator. The system records what the callback in the system, when the elevator service provider or technician was notified of the callback, when the technician arrived onsite, how long he was onsite, what he did to rectify the callback and recorded his actions. The system has the service level agreements from the contract in the system so it will inform the building if the technician met the service level agreement for response time on site and it will also track the number of callbacks to track if the elevator service provider is within contract service level agreements or industry best practices.

Testing. This refers to the authority having jurisdiction testing required intervals for the elevators to make sure they are safe and within code. This is usually every month for fire service testing. For larger safety testing it is yearly and every five years (in some markets it is semi-annual). Testing can be something else that is required by the local, state or federal having jurisdiction that will be set up in the system and is required for the vertical transportation unit. This may be on the main dashboard so the client may see when this is due. The system will inform the building in a defined specific timeframe prior that the testing is required. It will also show the technician that the testing is due when he is onsite and logged into the system. It can also send an elevator to the elevator service provider so they can inform the technician that the testing is due or coming due. The client/building may get large fines from local, state, and federal authority having jurisdiction and governing agency industry specific credentials for not completing all required testing. This keeps the building safe and following all authority having jurisdiction code requirements. The technician should be reminded within an allotted time that this work needs to be completed. The building will also fail inspection if testing is not completed. When the technician comes onsite to complete the testing it is recorded when he is onsite to do testing how long it took to complete and any additional pertinent information for the testing like it failed. In the event that the local, state or federal authority having jurisdiction requires a witness for the testing the witness actions will be recorded in the system similar to the technician.

Repair. This is when there is a major something has to be done to the elevators it is needed with the elevator and the building notes something is wrong with the elevator and when the repair may happen, usually a part is ordered and takes time for it to arrive. Other tasks may be competed at the building while waiting for a repair. There may be a bubble or indicator knowing this. The system will record when the repair is scheduled, how long the repair will take, how long the repair took, what was the repair, what equipment needed the repair, what technician completed the repair and any other penitent notes about the repair and the actions of the repair.

Inspection. This is when the vertical transportation is inspected, viewed, at by the authority having jurisdiction on a set time interval dictated by the local, state or federal authority having jurisdiction. This may be a date showing in the dashboard and time needed when due. The building may be able to update the date when it was completed. This date will inform the technician and the building that all required task in ASME A17.1, other elevator related code, the authority having jurisdiction requirements must be met at a minimum by this date or the building will fail inspection. The authority having jurisdiction inspection will come in on the necessary date and perform the inspection checklist set by the local, federal or state code. The checklist is a list of items the local, state or federal authority having jurisdiction requires the building to pass in order for the buildings elevator, escalators, lifts, etc to pass inspection. The checklist is in the system and allows the authority having jurisdiction inspector or inspector to check off what has passed, failed, permit required, or other required fields for local, state or federal authority having jurisdiction. The system records what the inspector checks off from the inspection. The results of the inspection can be sent to the elevator service provider and/or technician, the building, the state. The system records the date of the inspection and tracks the required allotted time for the items to be cured if the elevator fails inspection and the required items that need to be rectified to pass inspection. The system informs the building the cure period and send reminders to all necessary inspector, building technicians that the work needs to be completed. The system maintains the data of the inspection infinitely. The system can also be used by the local, state and federal authority having jurisdiction to track the elevators under their domain to keep track of all the above. The system tracks the date, time, checklist, completion of the inspection, whether the elevator passed or failed, cure period and what was required to rectify the item failed this date ensures code compliance and safety of the people in the building. A complete history and timeline of all aspects of the inspection are captured. The technician may be onsite at the time of inspection and all his actions are recoded.

Modernization/Upgrade. This is when the vertical transportation equipment is changed. The work flow of a modernization which has all the task associated, timeframe of the task and duration. The technician selects a task performed based on the items to be completed for the modernization. When a modernization is being completed the technician or technician's logins into the system at the building. The technician selects the task he is starting from the list assigned, when he is completed with the task he hits complete task and if needed adds notes what was done. The system has the time to complete a specific task as a service level agreement in the contract. This building can see if the modernization is on time from the system. The system can also inform the technician if they are on time for completion of the modernization. The system will record when the task for the modernization for the vertical transportation has started, when it was completed, the duration of the task and if the task met the required service level agreement.

AIO. This is the Internet of Things technology that sends information to the system and the reporting is captured in the system. This is a sensor for motion, humidity, temperature or other physical characteristic that can collect data and send to the system. The system will record the information sent to the system, compute the data if necessary and allow the building to view the data. This allows the building, building owner, property manager, engineer to gather data on the equipment to make sure the building is safe and gets advanced notice to potential problems and gets notifications that someone like a technician is working on the equipment. All of the above items are readily available for all the authorities having jurisdiction code requirements Punch list This is any list of equipment maintenance or fix items that the building has to cure or rectify by the technician or service provider. If they failed an inspection they could put the list here or if they had an audit completed the list goes here. The items are tracked for completion by the required contractual or local, state or federal code mandated allotted time.

EMS (Elevator Management System) This is real time information of the elevator current operations and condition. The system delivers data about the elevator including the door open and close status is given, the floor the elevator is on, the elevator in service or out, traffic history of the elevator, performance of the elevator, time from floor to floor, and various other information is obtained from the elevator controller or elevator systems.

All this services are sold separately or can be used as a hole it depends on what the client purchases. The buildings can receive credit or refunds if the service provider does not uphold the contract.

All the data created in the system is data that the building or the client owns and can access per the required code requirements at any time. Currently, the building does not have access to any of this data in a consistent comprehensive to allow them to be compliant to all local, state and federal code for the safety of the people or building.

Users

In an embodiment, the present system and method may be accessible through the Internet and may have at least one system administrator (possibly more) and at least one user wherein the user is the building owner, building engineer, property manager or even security officer. The system administrator may enter a specific building into the system. The administrator may be able to create/edit/view/delete the user.

In an embodiment, the user may have an email, a password, and a "role." In an embodiment, the default role may be USER-ROLE; however, the administrator may be able to select an alternative role. The roles may control access to different features, modules, reports of the system.

The user initially logs into the system to initiate the first credential process so a service technician can log in. This is a dual log in which ensures any service technician, inspector is onsite doing the required legal code requirements. The technician or inspector must complete all required tasking to stay code compliant and ensure the safety of the building and the tenants. The codes they need to follow are ones such as Americans with Disability Act, International Building Codes, all American Society of Mechanical Engineers related to vertical transportation, all local electrical codes and many other governing bodies.

Buildings

In an embodiment, the administrator may be able to create/edit/view/delete a building. A building may belong to the user; a single user may own more than one building and may have the option to view the building they want from a list created in the system. In an embodiment, a task may be required per contract which are code requirements and industry best practice, to be performed on the vertical transportation at the building. The building may have a name, a logo, an IP address, an elevator having a name and a postal address. The IP address(es) may be a list of IP addresses that are valid for that specific building. As a result of linking the IP address to the building, technicians are prevented from being able to login to the system 'remotely' (from a coffee shop, home etc). This may force technicians to use a designated computer, tablet, smartphone, etc that is located in the building when working on the vertical transportation. In an embodiment, the IP Address must be validated the first time the technician logs into the system. The system may also have a dual login. The building or user with higher rights will have to be logged in prior to the technician to log on the computer, tablet, smart phone, etc, resulting in the technician to only have the ability to access the system from the building physical location.

Buildings often have multiple vertical transportation. The system may therefore have one or more vertical transportation which may be monitored and serviced and have numerous buildings. Vertical transportation may be listed by type, for elevators which are usually hydraulic or traction, escalators are escalators, lifts can be handicap lifts, chair lift and other type of lifts, and dumbwaiters are dumbwaiters. It is understood that the vertical transportation is for all of the vertical transportation devices and system which may also refer to elevators, escalators, lifts, dumbwaiters. Each vertical transportation may have a specific name. This is especially useful in buildings with multiple vertical transportation in numerous locations that have different code requirements for the safety of the building and the tenants in different states of municipalities. The building can instantly see which equipment is not under code compliancy, not being services, has testing or inspections coming up, past due or compliant. The building can see all the information happening on the equipment for the code compliancy and contract compliancy or soon as it is recorded Contractors The administrator may be able to create/edit/view/delete contractors (this is a company that does the vertical transportation maintenance, modernization, testing for inspection or called an elevator service provider or in the case of inspections may be an inspector and in the case of testing may be a witness). Internally within the system, this 'technician' section of the system may be used to, for example, specify expectations of what the contractor is supposed complete vertical transportation services per the contract or authority having jurisdiction or what the system shows based on the module of the system. An example of the expectations might be how soon the contractor should be onsite for entrapments and callbacks, what task are to be done, when to do testing, when there is an inspection. Further, the contractor section may specify the number of callbacks and entrapments allowed for a specific period of time as is stated in their contract. This may also allow the system to build reports and make sure that obligations that the contractor is required to do are properly being performed. The building can have all reports, history of equipment readily available for code requirements. The contractor can view past data for protection and safety so he knows all the history. There is currently no way for the technician to gather history of equipment. The administrator may set the expectations that are in the contract in the backend with the service level agreements which are in the contract and/or all the requirements of the authority having jurisdiction. A list of obligations may be given in the initial contract, but may change for each building depending on the specific circumstances. There is also code requirement set by the local, state or federal authority having jurisdiction that may be part of this at a bare minimum. The contractor may be able to look for the required obligations in a "fuzzy" logic by typing in the actual obligation (or 'task') and/or the task may be set. The system may also monitor and record the entire onsite visit of the contractor including but not limited to actual time arrived and time onsite as well as the number of visits the contractor makes in response to a callback, an entrapment call or when doing maintenance.

The contractor may have a specific name, and a list of contract obligations (or "tasks"). The list may include a time frame for when the task needs to be done. For example, the time frame may be weekly, monthly, quarterly, annually, twice a year, etc. The service level agreement for time to be on site is in the code. The system tracks the number of hours on site, testing completion dates, entrapments and callbacks and others as needed maybe added so another area of accountability may be tracked. If there is a change of Contractor the historical data is all saved and the new contractor is added. Contractor may change and the ability to still maintain the information from the past contractor and the new contractor remain in the system. A contract logs in with a username and/or password to a computer, tablet, smartphone or other device.

Vertical Transportation

In an embodiment, the Administrator may be able to create/edit/view/delete vertical transportation equipment like all type of elevators, escalators, lifts and dumbwaiters (building has many vertical transportation units). An vertical transportation unit cannot be created without a building. As stated above, the vertical transportation units may have a name when multiple vertical transportation units are located within a single building. The vertical transportation units are tracked in the system so the building can have full view of the status of the equipment from all the items named and stated before the building remains compliant to all code and adheres to all safety of the technician and the building tenants. The vertical transportation code is different in every municipality following the specific local, state or federal code and a building can have all their vertical transportation documents in a secure manner and readily available per all code requirements.

Tasks

The administrator may be able to Import tasks using excel, as well as edit/view/delete tasks the task are tied to a federal, state local code requirements, industry best practices contract and the contract requirements are added when a client/building is set up. A client may have multiple buildings with different contracts and therefore different tasking and may even have multiple local, state of federal code requirements to follow. Contractors for completing the task. The code requirement for the interval of completing the task like monthly, quarterly, yearly can all be different based on location of the building and are all tracked in the system.

The task may have a name, time duration to complete task. The task are tracked in the system when completed or, not and by technician how long it took to complete the task. The task can be part of a maintenance control programs which is required by code. These tasks can be viewed by the service provider or the technician for safety and efficiency. The task is readily available for the local, state or federal authority having jurisdiction. The code requires this data to be readily available.

Equipment Details

The administrator may be able to import/create/edit/view/delete equipment details of the vertical transportation unit or units items like capacity, machine type, controller type, speed of equipment, installation date, code date, testing date, inspection date, all callback history, all entrapment history, all tasking and many other data points.

The equipment information is in the system may be accessed by the building and users easily. The equipment information that can be viewed by the technician has the historical data for the vertical transportation including task completed, notes, or another data the system is collecting. The technician can see all the work that was completed on the equipment in real time which is currently not available to them from the building or from their company.

Roles

Roles may control access to the different parts of the system as well as features of the system. For example, if a user has reporting roles they will have access to report, dashboard roles have access to dashboards, etc. If the user has multiple buildings they have access to the buildings or building they are responsible for or want access to based on their role. The ENTRAPMENT_ROLE that user may be able to see and create new entrapments. This may allow the administrator to have flexibility when creating users and enabling different features for different users. The technician has access to the appropriate roles and services within the system. The roles may include the below:

ADMIN—administrator role—the highest role that only the administrator may have access in setting up the system for a building or client.

SUB_ADMIN In some embodiments, the system may have a sub-administrator which may allow clients to add their own data.

USER_ROLE—A default role that may be assigned to every user of the system. For example, a client, a building owner, etc may have a USER-ROLE.

BUILDING_OWNER—a role which may control who may see the dashboard and who may generate reports for a building. The building owner may be a user_role which may look at one building or many building.

ENTRAPMENT—role that controls who may see and create entrapment work requests and complete the entrapment work done.

PREVENTATIVE_MAINTENANCE—role that controls who may see preventative maintenance tasks. The technician may check the task.

CALLBACK—role that controls who may see and create callback work requests and complete the callback work done.

TESTING—role that controls who may see testing tasks and complete the testing work done.

OTHER—role that controls who may see and create other work requests and complete the other work done REPAIR—role that controls who may see and create repair work requests and complete the repair work done.

AIO—role that controls who may see and create internet of things alerts and data TECHNICIAN—This is someone that can access the system and assigned to a building or buildings.

MODERNIZATION—role that controls who may see and complete the modernization work done.

PUNCHLIST—role that controls the active punch list items that are required to be done the technician and can be tracked by the building.

INSPECTION—role that controls who may see and complete the inspection work done and the work for the inspection was completed.

EMS—role controls the real time tracking of the elevators status like the door open, door close, car location in the hoist-way, car running, and others and reported in the system.

Building Owner (Client) or Building Agent or Representative Like a Property Manager [Role: BUILDING_OWNER]

This is a user with BUILDING_OWNER role who may be able to access dashboard for his/her inventory of buildings and vertical transportation Client may be able to view a list of his/her buildings Client may be able to view a list of his/her vertical transportation and the work assigned like callbacks, entrapments, preventative maintenance, testing, testing inspection, inspection time frames, open punch list items, hours for preventive maintenance, travel time to onsite, modernization contractual service level agreement for service provider, code compliancy for upcoming code requirements.

Client may be able to generate and view different reports (defined below). This information can be viewed in the system on line, information emailed to them, or ability to download in excel or a chart. The client can also set up with the administrator a timeframe to have the needed information emailed to them directly from the system.

Technician [role: no role, may be able to use the system based on IP address or dual log in]

A technician is someone who works for a contracting elevator company or in the case of the inspections may either be a technician or an inspector and in the case of testing maybe a witness.

Use Case Scenarios:

A technician comes for preventive maintenance, modernization, inspection, testing or callback, entrapment or "work request" (work request definition below)

The technician may come on site as required by the contract or may see open work requests.

The technician may click on a link to "Log in." The system may ask for his/her name which may be free form and which may record the time of log in. Then the system may show him/her open work requests like callback, testing, inspections and the preventive maintenance option. He/she then clicks on one or more offered work requests, modernization, testing, inspection, or the preventive maintenance option (a technician cannot do the preventive maintenance and work requests at the same time, but he/she may do more than one work requests during the same visit. A technician may see work requests that are assigned in the software). The system may record date/time and what work requests he/she is assigned. When he/she is done working, a technician may click on his/her name from the list of technicians (90% of the time there may be one technician in the building but at some point there maybe two or maybe two different elevator companies assigned to one building) who are in the building, he/she may be able to add notes about the work he had performed, and have an option to select that the work is completed or that he is putting the work requests on hold (this may only happen in callbacks or repairs a very small percentage). Putting a work request on hold means that the work request is still open and someone else may continue working on it. This may happen in the repair, modernization, inspection, testing.

A technician comes back to continue working on a work request or preventive maintenance When this happens, the process may be almost identical as the one described above with the only difference being that the technician may need to select tasks which he/she was already working on and left open. If it is a different technician, the different technician may have the option to close out the task and put his/her initials into the system. The system can distinguish between different technician is completing the work or checking out the technician who never completed the work performed from the given list of tasks.

The technician activity is being monitored and the request the building owner has made to the technicians company to make sure they are operating in the utmost safe and efficient manner following all codes to ensure the building is compliant for all code and people are safe.

A technician may view "Elevator Information" which is available to the technician when he is logged in the system may allow him/her to pick the vertical transportation unit and date range. The system may then show everything that was done on that vertical transportation unit during the time frame selected from the same date or from a requested date. And by who did the work. They have the ability to print this information. All technician activity is being tracked and monitored.

Work Request

A work request is one of the following: (Note work request may not be an actual request but a requirement in a contract that is automatically followed. A formal request is not a required)

Preventative Maintenance—this is defined and part of the contract The technician may be required to do this work per the contract and the authority having jurisdiction code requirements. The technician may be required to perform these task(s) on a monthly, quarterly, yearly basis depending on the contract. The technician may say what he/she did after the work is a completed however he/she may log in when on site in a notes field.

When competed he/she may be able to pick from "fuzzy logic" or set listed of task completed and the elevators he/she has worked on.

Entrapment This is when there is someone trapped in the elevator and the building notes someone is trapped and calls the elevator company and or fire department or proper authority having jurisdiction to get them out. This is all recorded to meet the service level agreement of the contract. The technician must show up within an allotted time and this is all tracked for reporting. A bubble or indicator may show up once the building person put it into the system. The technician arrives on site and knows what to do on which vertical transportation unit because of the bubble or indicator. All technician activity monitored is tracked and recorded here.

Callback. This is when there is a problem with the elevator and the building notes something is wrong with the elevator and calls the elevator company so they will come on site to fix an issue they are having on equipment. This is all recorded to meet the service level agreement of the contract and/or industry standards. The technician must show up within an allotted time and this is all tracked for reporting. A bubble or indicator may show up once the building person put it into the system. The technician arrives on site and knows what to do on which vertical transportation unit because of the bubble or indicator. It logs in when onsite and records in the system what has to be done (this is already populated) and the technician completes the work and records in the system. This information is readily available per code and safety of the technician and tenants. All technician activity monitored is tracked and recorded here.

Testing This refers to the authority having jurisdiction testing required intervals for the elevators to make sure they are safe and within code. This is usually every month for fire service testing. For larger safety testing it is yearly (CAT 1) and every five years (CAT 5) (in some markets it is semi-annual or different intervals). Testing can be something else that is required by the local, state or federal having jurisdiction that will be set up in the system and is required for the vertical transportation unit. They system notifies the users in in the system or via email that the testing is due, close to being due, due by the date and allotted reminder time. The client/building may get bid fines for not completing the testing within the required times. The technician should be reminded within an allotted time that this work needs to be completed. This keeps the building compliant and tenants and public safe. There may be a bubble knowing this. The system will record when the other is recorded, how long the other will take, how long the other took, what was the other, what equipment represented the other, what technician completed the other, if applicable and any other penitent notes about the other and the actions of the other. The tracking of the other activity is all gathered in the system.

Other This refers to anything the building may want to record in the system and have a record of that is not available someplace else in the system.

Repair. This is when there is a repair or major something has to be done to the elevators it is needed with the elevator and the building notes something is wrong with the elevator and when the repair may happen, usually a part is ordered and takes time for it to arrive. Other tasks may be completed at the building while waiting for a repair. There may be a bubble knowing this. The system will record when the repair is scheduled, how long the repair will take, how long the repair took, what was the repair, what equipment needed the repair, what technician completed the repair and any other penitent notes about the repair and the actions of the repair. The tracking of repairs are required for code and to allow the building to track downtime of equipment from a repair being completed to inform the tenants and allows the building to have a history of this repair information.

Inspection This is when the vertical transportation is looked at by the authority having jurisdiction on a set time interval dictated by the local, state or federal authority having jurisdiction. This may be a date showing in the dashboard and time needed when due. The building may be able to update the date when it was completed. The technician may not do this work but rather a record of his presence. This date will inform the technician and the building that all required task in all required code like ASME A17.1, other elevator related code, the authority having jurisdiction requirements must be met at a minimum by this date or the building will fail inspection. The authority having jurisdiction inspection will come in on the necessary date they determine and perform the inspection checklist. The checklist is a list of items the local, state or federal authority having jurisdiction requires the building to pass in order for the buildings elevator, escalators, lifts, etc to pass inspection and be warranted as safe and receive the annual elevator inspection. The checklist is in the system and allows the authority having jurisdiction inspector or inspector to check off what has passed, failed, permit required, or other required fields for local, state or federal authority having jurisdiction. The system records what the inspector checks off from the inspection. The results of the inspection can be sent to the elevator service provider and/or technician, the building, the state. The system records the date of the inspection and tracks the required allotted time for the items to be cured if the elevator fails inspection and the required items that need to be rectified to pass inspection. The system informs the building the cure period and sends reminders to all necessary. The list of items that need to be rectified are tracked to ensure completion. The system maintains the data of the inspection infinitely. The system can also be used by the local, state and federal authority having jurisdiction to track the elevators under their domain to keep track of all the above. The system tracks the date, time, checklist, and completion of the inspection, whether the elevator passed or failed, cure period and what was required to rectify the item failed. The technician may be onsite at the time of inspection and all his actions are recorded. The system tracks upcoming local, state and federal code requirements which are required by the building to pass inspection.

Modernization/Upgrade. This is when the vertical transportation equipment is changed. The work flow of a modernization which has the entire list of tasks associated, timeframe of the task and duration. The technician selects a task performed based on the items to be completed for the modernization. When a modernization is being completed the technician or technician's logins into the system at the building. The technician selects the task he is starting from the list assigned, when he is completed with the task he hits complete task and if needed adds notes what was done. The system has the time to complete a specific task as a service level agreement in the contract. This building can see if the modernization is on time from the system based on the initial schedule provided and agreed upon with the service provider. The system can also inform the technician if they are on time for completion of the modernization. The system will record when the task for the modernization for the vertical transportation has started, when it was completed, the duration of the task and if the task met the required service level agreement.

A work request or time interval for code compliancy service work may be created by any one that assigned the role from the administrator like a building security officer or a building owner, property manager, etc (basically the user assigned to do this from the administrator).

Preventative Maintenance

The task may be created by the admin and may be different by building and per the local, state, federal authority having jurisdiction.

Date, time it was created and competed with intervals and service level agreements for the preventative maintenance is recorded for industry standards or based on contract. The total time onsite for preventative maintenance is recorded for industry standards or based on contract. In the event that the preventative maintenance required hours and tasking were not completed per the contract the building owner is notified and can receive a credit from the service provider.

Entrapment work request may have:
Vertical Transportation unit selector
Date time it was created and competed with intervals and service level agreements The service provider is required to be onsite with the allotted timeframe of the client can receive a credit from the service provider.
Description
Name of the Person Creating the Record
Technicians logs when arrives and logs out when leaves. The entrapment bubble or indicator will show where the entrapment is.
Callback work request may have:
Vertical Transportation unit selector
Date time it was created and competed with intervals and service level agreements. The service provider is required to be onsite with the allotted timeframe of the client can receive a credit from the service provider.
Description
Name of the person creating the record
Technicians logs when arrives and logs out when leaves. The call back bubble what the callback issue and what equipment.
Testing Technicians logs when arrives and logs out when leaves or the testing has been completed. Witness for the testing may log in as well and may record information in the system if required by the local, state or federal code.

Other work request may have (other may be used for something generic that does not fall under one of the categories above)
Vertical Transportation unit selector
Date time it was created and competed with intervals and service level agreements Description
Name of the person creating the record
This is usually just notes for the building like someone is moving in and out and the elevator will be out of use for the public or there is a party that the elevator will be dedicated to for the day.
Repair work request may have:
Vertical transportation unit selector
Date time it was created and competed with intervals and service level agreements
Description
Name of the person creating the record
Technicians logs when arrives and logs out when leaves. The repair bubble or indicator will show what the repair is and it will disappear once the technician completes the repair.

Client Dashboard [Role: BUILDING_OWNER]

A client (user, building owner) may be able to access building or buildings dashboard. If he/she owns more than one building he/she may be able to switch between buildings and the dashboard may show data for the building selected.

The dashboard may show and be available for viewing based on giving access to the user.

Number of callbacks, entrapments, the number of hours for preventative maintenance over the last month. The last test date, last inspection date, for the building
List of the equipment and the equipment data.
Last technician activity
Date
Duration
All activity preventive maintenance, callback, entrapment. Entrapments and callbacks may be two different boxes reporting the allotted number of callbacks per contract, industry best practice, code and/or contract with the service provider.
Total number of callbacks for the current year or allotted time
Testing dates
Next scheduled monthly testing date
Next scheduled annual/five testing date More detail was above
Inspection Expiration dates
Inspection cure expiration date if failed inspection
Contract expiration date
A bar chart showing Contracted Time Vs Actual Time per month for a three month period The user can change the date son the dashboard to pull up historical data. It may differ between buildings and the mission critical of the elevator.
A bar chart showing number of Entrapments and Callbacks per month for the current year Any data collected within the system can be made available in the dashboard.

Reports [Role" BUILDING_OWNER] all are Available in the System.

A client (user, building owner) may be able to generate the following reports:
Actual Tasks Completed
Buildings with entrapments
Callback details
Callback summary
Contracted tasks vs actual Contracted time vs actual time
Elevator details
Entrapment details
Maintenance details
Other details
Punch list
Repair detail
Testing details
Onsite detail
Modernization
AIO Every report may be generated and viewed in the browser Every report may be downloaded in excel format the format.

Service level agreements requirements can be automatically emailed when they are missed.

Every report may be emailed to the client

Any data collected within the system can be made available for custom reporting.

AIO [role: BUILDING_OWNER] this feature may have the ability to see if someone has arrived at the building or in the specific area to set of the device and it will give physical characteristics to the system to see how the equipment is preforming. This data is using internet of things technology to provide real time data.

In an embodiment, a primary benefit of the present system and method is that the system and method may require a dual login by both the building and the technician.

The login by the building and/or the technician may require an individual PIN to gain access to the system. In particular, to eliminate the chances of a technician skipping a required task assignment, the technician must physically be at or within the building in order to log into the present system. For example, the technician may need to either: 1) use any computer system, such as a personal tablet, which then utilizes the specific IP address of the physical building the work is to be performed at and/or 2) the technician must actually use a computer that is physically within the building to be worked on in order to log into the system. As a result, the technician cannot log into the system remotely and claim he/she was in the building performing a task.

In addition to the technician being required to physically be in or at the building in order to log into the present system with his/her PIN, the building itself must log into the system. Preferably, the building logs into the system utilizing a PIN. As a result, a "dual login" for the technician is required in order for the technician to access and/or update any information located within the system, such as work which was performed. In an embodiment, the building logs into the system first, before the technician can log in. This building log in will allow the technician to have the ability to log in. The building logs in upon starting the system and remain logged in by the system until they change their password, then they log in again with new password.

After the technician is logged into the system, the technician may elect what tasks he/she will then perform. The tasks may be, for example, preventative maintenance, callbacks, emergency callbacks, entrapments, repairs, cleaning or other tasks. After the task is performed, the technician may update the system to indicate that the task was completed. The system time-stamps all actions. In an embodiment, a building may elect for an individual to be able to log into the system without being able to alter the information stored within the system. This may be desirable to use with, for example, local, state or federal authority having jurisdiction governmental inspectors. Alternative embodiments allow the individual, such as a local, state or federal authority having jurisdiction governmental inspector, to alter the information on a limited basis such as, for example, keeping track of "passed" or "failed" tests performed on an elevator. In an embodiment, the inspector must also have a valid PIN to log into the system.

In one embodiment, the system may have best case/worst case parameters set for each task on a punch list to be performed. For example, because the time spent on any one specific task is always recorded by the system, over time, the system will be able to have a best case and worst case time frame for each task to be performed. In particular, after prior data has been accumulated, the system might determine that it should take, for example, between two and three hours for a technician to properly clean a specific elevator. When a technician logs into the system and is assigned or selects the task of cleaning that elevator the system will keep track of the exact time it took the technician to complete the cleaning of that elevator. If the time it took the technician to clean that elevator exceeded the worst-case parameter the additional time it took to clean the elevator may affect the payment under the contract the building has with the technician or the technician's company. Because the system is always tracking the time spent on a specific task the system and calculates that time may alter the best case/worse case parameters as time progresses. For example, as an elevator gets older, the estimated time to clean that elevator may increase over time which is tracked in the system.

In an embodiment, the system and method may have a Maintenance Control Program (MPC). The MPC may be required by local, state and federal code and governmental code and the MPC information in the system may include all the data accumulated by the system. In an embodiment, a local, state or federal authority having jurisdiction governmental inspector may be able to view all the data in the system.

Because a user may own and/or operate multiple buildings, in an embodiment, the user may have the option to use the system for any of those multiple buildings. In particular, a user may first select a task to be performed on an elevator at a building at, for example, 123 Main Street or 456 Maple Street. Once the user selects the specific building, the user may then enter the task to be performed within that building. Further, in an embodiment, the building may simply utilize email, instead of logging into the system, to order a task to be performed.

In an embodiment, when the building initiates a problem call entry into the system, the automatic clock of the system may start to run for the technician to both show up at the building to start work on the task/problem and the system may also record the time it took for the technician to complete the task and fix the problem.

The system is especially suitable for allowing a later technician to view, in real time, the prior work done to the elevators (or other transportation unit) by different technicians so that work is not repeated and, therefore, time and money wasted. In particular, a technician may log into the system and see that, for example, required callback of one or more elevators in a building was already done. As a result, the current technician working in the building may skip the already done task for the elevators and focus on alternative items to fix the equipment. This may increase productivity, safety and save the building downtime.

In an embodiment, the system automatically generates a punch list. The punch list may be created after the building generates an audit. The punch list may include, for example, the dates for required inspections and cleaning of the elevators. In an embodiment, the punch list may be automatically sent to the building to keep proper individuals associated with the building informed of all actions. This may further be done in real-time.

In one embodiment, the system is useful for other recording of data such as, for example, recording and updating information related to HVAC systems, plumbing systems and security systems, etc. As a result, the system may be useful for controlling the data and tasks related to almost all aspects of a physical building.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A system for monitoring information and repairs related to vertical transportation, the system comprising the steps of:
    providing an elevator, escalator, dumbwaiter or lift as the vertical transportation;
    providing a data recording system; and
    requiring a dual log in system wherein a building owner must log into the data recording system;
    requiring a elevator, escalator, dumbwaiter or lift technician to log into the data recording system;
    wherein the data recording system provides real-time information regarding the elevator, escalator, dumbwaiter or lift; and
    wherein the technician updates information related to work performed on the elevator, escalator, dumbwaiter or lift once the technician is logged into the system and once the work is completed by the technician.

2. The system for monitoring information and repair related to vertical transportation of claim 1 further comprising the steps of:
    connecting the data recording system to the Internet.

3. The system for monitoring information and repair related to vertical transportation of claim 1 wherein the building owner must log in to the data recording system before the technician logs into the stat recording system.

4. The system for monitoring information and repair related to vertical transportation of claim 1 wherein the data recording system requires the technician to be physically within a building being worked on in order for the technician to log into the system.

5. The system for monitoring information and repair related to vertical transportation of claim 1 wherein the data recording system requires the technician to use an IP address of a specific building being worked on in order for the technician to be able to log into the system.

6. The system for monitoring information and repair related to vertical transportation of claim 1 further comprising the steps of:
    allowing an inspector to have access to the data recording system wherein the inspector may issue a pass or fail notice to a test performed on the elevator, escalator, dumbwaiter or lift.

7. The system for monitoring information and repair related to vertical transportation of claim 1 wherein the work performed by the technician is preventative maintenance, a callback, an emergency call, an entrapment check-up, a repair or a modernization.

8. The system for monitoring information and repair related to vertical transportation of claim 1 wherein the data recording system keeps track of the average time it takes a technician to complete a specific task and wherein the data recording system updates the average time to complete that task after the technician completes the task.

9. The system for monitoring information and repair related to vertical transportation of claim 1 wherein the system sends an email to the building owner once a task completed by the technician is completed.

10. The system for monitoring information and repair related to vertical transportation of claim 1 wherein the data recording system automatically notifies the building owner of an upcoming required inspection.

* * * * *